Oct. 1, 1929.  L. M. CLARK  1,729,988
HAND STRAP BRACKET
Filed April 14, 1928
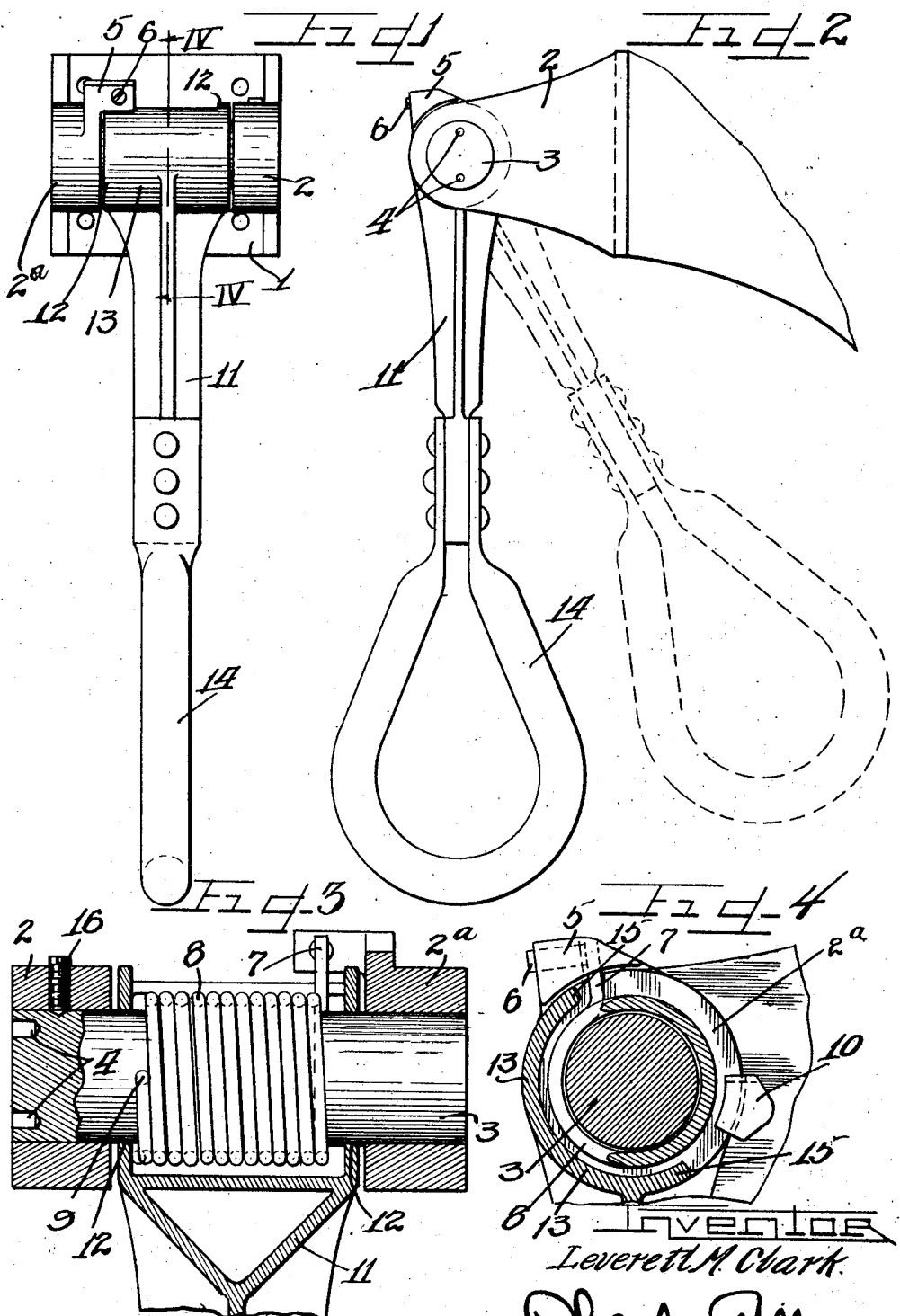

Patented Oct. 1, 1929

1,729,988

UNITED STATES PATENT OFFICE

LEVERETT M. CLARK, OF BUFFALO, NEW YORK, ASSIGNOR TO WAUGH EQUIPMENT COMPANY, OF CHICAGO, ILLINOIS, A CORPORATION OF MAINE

HAND-STRAP BRACKET

Application filed April 14, 1928. Serial No. 269,898.

This invention relates to a strap hanger bracket.

In the past it has been customary to suspend a plurality of strap hangers from a single rod, and, if one of the hangers should break or require replacement, it was necessary to remove the rod before a hanger could be replaced. This required a great deal of time and labor.

To overcome this objection, an individual supporting bracket is provided for each hanger, so that it is possible to remove a single hanger from its bracket without disturbing the others. The bracket is also constructed to provide suitable stops for the hanger.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a front elevational view of the hanger and bracket involving this invention.

Figure 2 is an end elevational view of the same.

Figure 3 is an enlarged part sectional and part elevational view taken in a longitudinal direction thru the bearings of the bracket.

Figure 4 is an enlarged sectional view taken substantially upon the line IV—IV of Figure 1.

In the illustrated form of this invention, there is shown a bracket consisting of an attaching plate or back 1 having forwardly extending bearings 2 and 2$^a$ for receiving a short shaft 3, one end of which is provided with indentures 4 for receiving a spanner wrench or the like, whereby the shaft may be rotated. In the present instance, the bearing 2 is provided with a lug 5 that projects inwardly beyond the bearing. An adjustable screw 6 is threaded in this lug for forming an adjustable abutment for one end 7 of a coil spring 8 that surrounds the shaft 3 and has its other end anchored to the shaft as indicated at 9 (Fig. 3). The bearing 2$^a$ is provided with a second lug 10 (Fig. 4) that projects inwardly beyond the bearing 2$^a$.

A shank 11 is provided with terminal cylindrical bearings 12 that surround the shaft 3 and a semi-circular shield 13 that protects the spring 8 and conceals the same. The shank 11 has attached thereto the usual handle 14 which may be swung in either direction until one of the ends 15 of the shield 13 strikes the stop 10. When the handle is swung in a clockwise direction, as viewed in Figure 4, the end of the shield will, of course, engage the end 7 of the spring 8 and cause the same to move therewith for tensioning the coil.

The tension of the coil spring may be adjusted by loosening the set screw 16 that holds the shaft 3 against rotation and applying the spanner wrench to the shaft 3 and rotating the same.

In the event that a hanger is broken and it is desired to remove the same in order to substitute a new one, or if it is desired to replace a hanger for any other cause, it is only necessary to remove the shaft 3, insert the new hanger and replace the shaft. Of course, the spring 8 must first be disconnected from the shaft.

It is, therefore, possible, according to this invention, to replace a hanger without disturbing other hangers, and to accomplish the same quickly and easily.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. In a device of the character described, a bracket having an attaching portion and a pair of spaced shaft bearings, a shaft mounted in said bearings, one of said bearings having a lug, a hanger having bearings surrounding said shaft, and an arcuate shield for coaction with said lug.

2. In a device of the character described, a supporting bracket having spaced bearings, a shaft adjustably anchored in said bearings, a stop lug on one bearing, a coil spring surrounding said shaft with one end anchored to said shaft and the other end engaging said stop lug, a hanger journalled on said shaft between said bearings, said hanger having a shield extending over said spring and said bracket having a second stop lug in the path of said shield.

3. In a device of the character described, a bracket having spaced bearings, a shaft supported in said bearings, adjustable means for securing said shaft against rotation, a coil spring having one end anchored to said shaft, said bracket having a lug for engaging the other end of said spring, and a hanger supported upon said shaft between said bearings and having a shield covering said spring.

In testimony whereof I have hereunto subscribed my name at Depew, Erie County, New York.

LEVERETT M. CLARK.